March 1, 1932. C. E. REED 1,847,981

SECTION ROLLER CUTTER ORGANIZATION FOR EARTH BORING APPARATUS

Filed July 23, 1930 2 Sheets-Sheet 1

Inventor:
Clarence E. Reed,
By Spear, Middleton, Donaldson & Hull
Attys.

March 1, 1932. C. E. REED 1,847,981
SECTION ROLLER CUTTER ORGANIZATION FOR EARTH BORING APPARATUS
Filed July 23, 1930 2 Sheets-Sheet 2
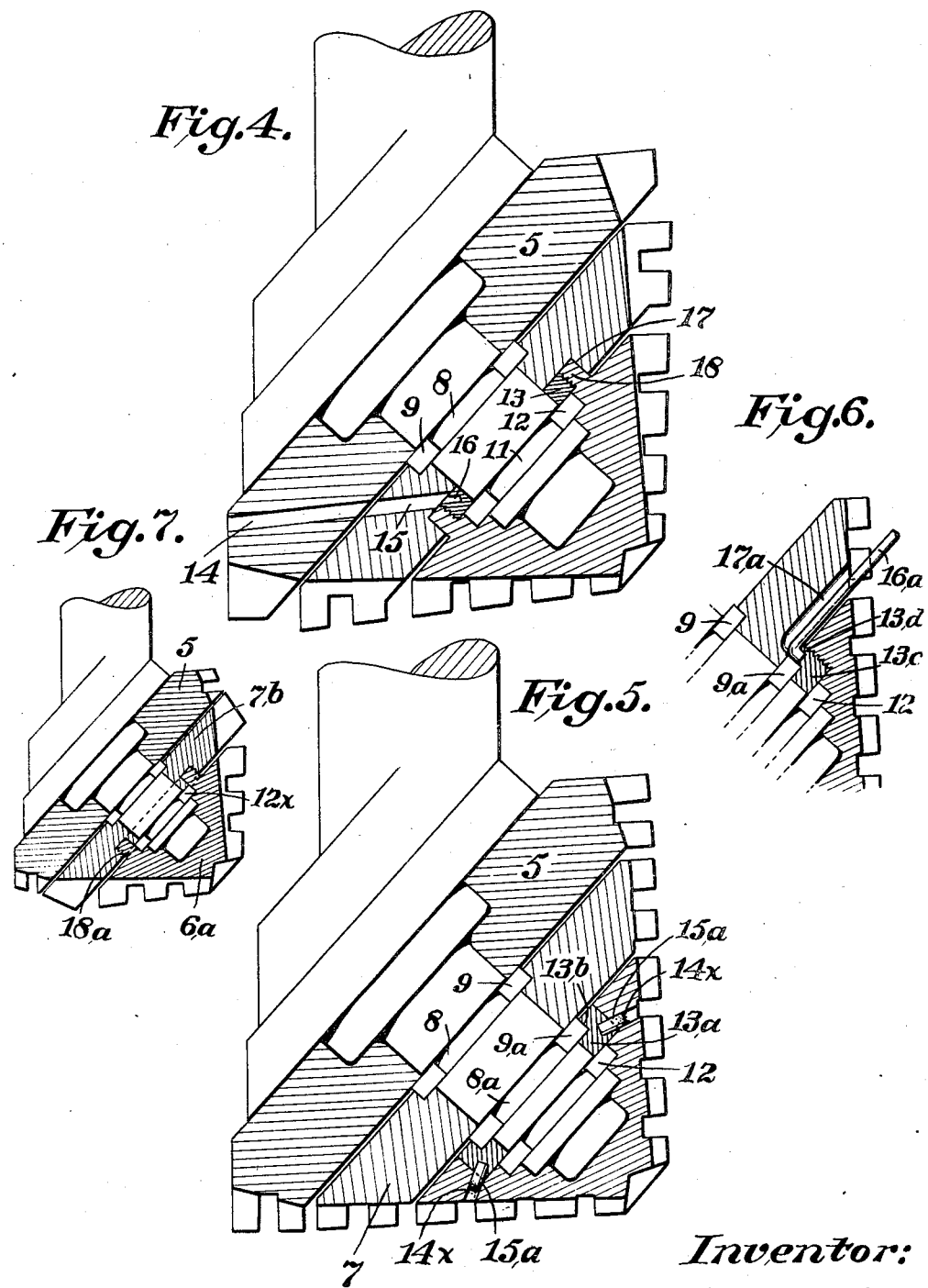
Inventor:
Clarence E. Reed,
By Attys.

Patented Mar. 1, 1932

1,847,981

UNITED STATES PATENT OFFICE

CLARENCE E. REED, OF WICHITA, KANSAS, ASSIGNOR TO CHICAGO PNEUMATIC TOOL COMPANY, OF NEW YORK, N. Y., A CORPORATION OF NEW JERSEY

SECTION ROLLER CUTTER ORGANIZATION FOR EARTH BORING APPARATUS

Application filed July 23, 1930. Serial No. 470,166.

The invention concerns roller cutter means for earth boring apparatus such as are used in drilling deep wells. The cutter is of substantially frusto-conical form and is composed of sections mounted upon a spindle and each capable of independent rotation.

The invention consists in the features and combination of parts hereinafter described and particularly pointed out in the claim.

In the accompanying drawings is shown in Fig. 1 a central sectional view of the invention.

Fig. 4 is a sectional view showing means whereby the point section may be held on the spindle by devices located entirely external to the spindle.

Fig. 5 is a part sectional view and part elevation of another form in which the point section is held by means external to the spindle.

Fig. 6 is a detail partly in section of another form embodying the principle of Figs. 4 and 5.

Fig. 7 is a similar figure to Figs. 4 and 5 showing another modification.

Figure 1:
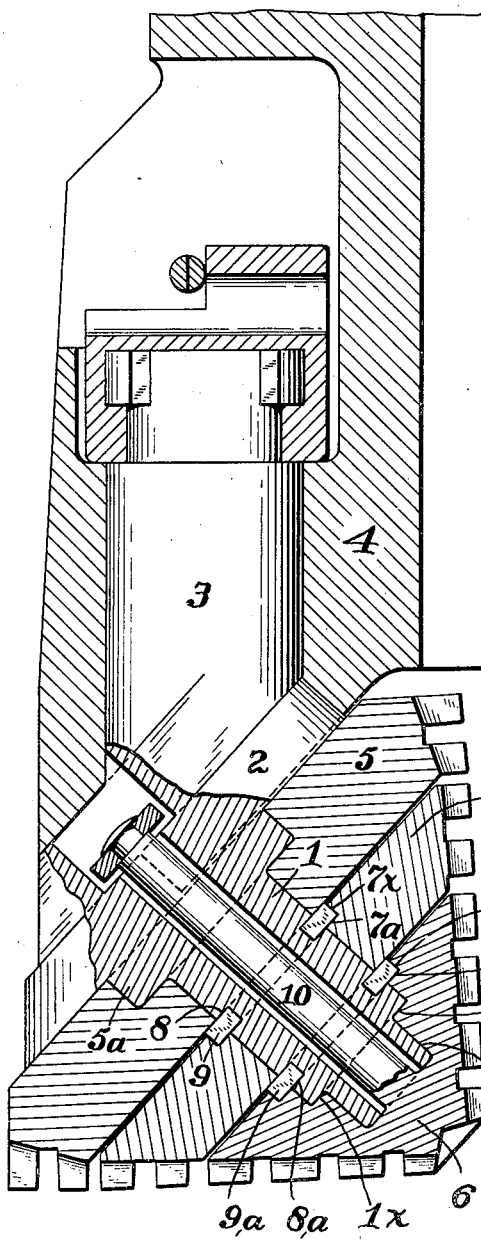
Figure 2:
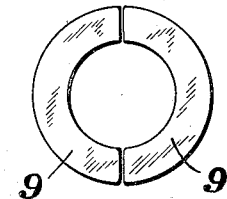
Fig. 2 is a view of one of the segments for holding certain of the sections of the cutter rotatively upon the spindle.
Figure 3:
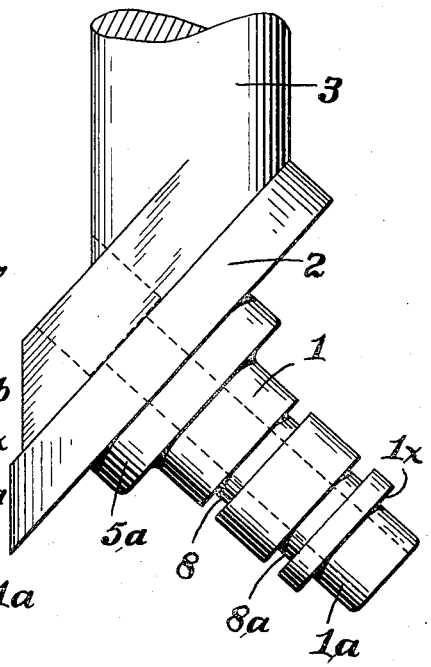
Fig. 3 is a view of a spindle only showing the grooves to receive the segments, and also showing the thrust shoulder.

In these drawings 1 is a spindle upon which the roller cutter members are mounted. This spindle is shown, in the present embodiment of the invention, combined with a base plate 2 and a shank 3. The base plate lies in a plane at right angles to the spindle and the shank extends at an angle to the base plate and the spindle axis, said shank having its axis vertical.

It is adapted to be inserted into a socket in the bit head part of which is shown at 4. The shank socket extends with its axis parallel with the vertical axis of the bit head. Any suitable means may be employed for holding the shank in the socket of the bit head.

The roller cutter is composed of a plurality of sections. One of these forms the base of the frusto-conical body and is shown at 5. There is also a point section 6 and a section 7 intermediate the point section and the base section. The spindle has a flange 5a and the base section has its bore enlarged to receive this flange or collar of the spindle.

At 8 the spindle is provided with an annular groove. In this segmental locking pieces 9 are placed. They project beyond the bearing face of the spindle. The base section is locked on the spindle by these segmental pieces against axial movement, but is free to rotate on the spindle. The base section has its front face bearing on the rear faces of the segments. It is therefore held in position axially on the spindle by bearing on the collar at one side and on the segmental pieces on the other side. The intermediate section is likewise held in place on the spindle by locking segments. These are shown at 9a. They are located in a second annular groove 8a, and the outer face of the intermediate section bears against the rear face of the segments 9a which thus lock the intermediate in place against axial displacement on the spindle while allowing the same to have free rotary movement.

The intermediate section is recessed at 7a in its base face and those portions of the locking segments 9 which project from the annular groove in the spindle lie in this seat recess. The wall 7x of this seat recess overlie the locking pieces which pieces are thus held in place.

The spindle has its end reduced in diameter at 1a, thus providing a shoulder 1x spaced apart from the second annular groove 8a.

The point section has a cylindrical bore to fit the reduced end of the spindle. This bore is enlarged to receive the full diameter portion of the spindle. The shoulder 6a of the point section which lies between the small diameter bore and the enlarged bore of the point section bears against the shoulder 1x. The bore of the point section is further enlarged at 6x and the annular overhanging wall 6b of this enlarged bore or seat recess overlies the locking segments in the second groove 8a and retains them in place so as to lock the intermediate roller cutter section on the spindle rotatively.

It will be seen from this construction that each of the two sections i. e. base section and intermediate section is locked against axial displacement on the spindle by locking segments located in annular grooves in the spindle, which pieces are borne upon by the plain faces of said sections and each set of locking pieces are retained in their respective groove by an overhanging wall of a seat recess in the base face of the adjoining roller cutter section. The working pressures in direction axially of the cutter organization are distributed to the two sets of locking pieces, that is to say, the stresses resulting from the working of the base section are taken by the first set of locking segments, while the stresses individual to the intermediate section are borne by the second set of locking pieces, it being noted that each cutter section is adapted to rotate individually or independently in respect to the other section or sections. The locking segments take endwise thrusts on the base and intermediate sections. They confine each section to its allotted space, to perform its allotted work, and they prevent the stresses and progressive wear from being concentrated or accumulating at one point. Under some conditions the sections may contact on their faces and thus relieve the segments of part of the working thrusts from the bottom of the hole, and distribute to all the segments simultaneously the end thrusts from side of bore, and concentrate the end thrusts from bottom of hole on the thrust shoulders of the spindle.

The point section is held in place by its stem 10 which is integral therewith and extends through the central bore of the spindle. This stem is held in place by a nut or enlargement on its end which lies opposite the face of the base plate. The enlargement may be welded on the stem.

There is clearance between the stem and the wall of the bore of the spindle to allow freedom of rotation of the said stem with the point section. This clearance is also for another purpose, viz. -in the event that the spindle bearing wears the stem will not bear, metal to metal, upon the wall of the bore of the spindle, and by undue pressure exerted thereon at some point cause breakage of said stem.

The sole purpose of this stem is to hold the point section to its work and prevent it from being pushed or pulled off from the spindle in an axial direction.

In this assembly irregular sizes and shapes of teeth readily may be formed on the sections. This is due to the fact that the cone cutter is composed of sections each of which may be separately handled and operated upon. This desirable irregularity of the shape of teeth is not possible of accomplishment in frusto conical cutters made of one piece, owing to limitations of available machine tool equipment of the present day for operating upon a cutter of frusto conical shape. A one piece frusto conical cutter necessarily moves as one body regardless of the character of the material over which it moves. The result of this is that the conical cutters are frequently dragged along the bottom of the hole and become flattened and therefore useless.

One objection to sectional types of conical cutters in the past has been the danger of loss of the cutter in the hole after the cutting organization becomes worn to a certain extent. By the use of the separate locking pieces in the grooves of the spindle for the respective cutter sections, this invention presents many of the advantages of rigidity obtaining in a one piece cone structure. Further a greater freedom of rotation in the assembly as a whole is secured as compared with a one piece frusto conical cutter. The sectional construction allows an independent rate of rotation of each section without undue interference or friction from another section.

By varying the inside and outside diameters of the sections the teeth may be constructed to dig on varying planes and at varying angles to the bottom of the hole, thereby more rapidly and efficiently disintegrating the formation.

The point section takes practically no endwise thrust at any time such as falls on the other and main digging sections. The cylindrical bore of the point section and its relation to the end of the spindle are important factors in the operation of this part. The cylindrical bore centers the point regardless of how badly it may be worn.

The parts of the assembly are placed together with working clearances to secure freedom of operation of the individual parts. The stem of the point section has as its main duty simply to hold this section in working position, and so long as this section is maintained in proper position, the other sections likewise will be properly maintained in their relative positions. The stem of the point section takes no working thrusts from the other sections, nor does it take any working thrusts normally on the point section from the bottom of the hole, nor from the squeezing effect arising from the sides of the hole. The sectional character of the conical cutter is particularly valuable in bits of large cutting diameters where two cones are employed to cut the entire area of the bottom of the hole. It is also desirable where very rapid penetration is desired by bits of the frusto conical type operating in shale and so-called soft earth formations in very deep wells. The stem of the point section is not alone spaced with substantial clearance from the wall of the bore of the spindle, but the head at the end of this stem is also spaced away from the shoulder or surface opposing it. This permits slight rocking motion in the point section when worn badly, without causing any binding of the stem in connection with the body or wall of the spindle.

While I have shown the sectional roller cutter mounted upon a bare spindle, it will be understood that the invention may be embodied in a form of assembly having a bushing on a pin, upon which bushing the sections are adapted to turn.

It will be noticed that the point section is deeply recessed at its end to provide teeth which will deeply penetrate the formation.

So far as the intermediate section is concerned, this will distribute axial strains in both directions, i. e. towards the point or towards the base, to the locking pieces at either side thereof. Furthermore axial strain from the point section towards the base of the organization may be taken more or less by the locking pieces which lie against the face of the intermediate section.

Referring to Figs. 4 to 7 inclusive, I show an organization in which the point section is held by means external to the spindle, and in which forms the spindle may be solid instead of being provided with an axial bore.

In Fig. 4 the spindle is provided with an annular groove at 11 holding locking segments 12 against which bears a ring 13 screw threaded externally and adapted to be attached to the point section. For this purpose the other sections of the roller cutter may be provided with openings 14, 15 through which when brought into alignment a suitable tool may be inserted to engage an opening 16 in the ring 13 for holding the same while the point section is being threaded thereupon. In assembling an organization such as shown in Fig. 4 the base section is first placed onto the spindle, whereupon its locking segments are put in place as shown at 9 in the groove 8. The intermediate section is then placed on the spindle, then the screw ring is placed on the spindle into a recess 17 of this intermediate section. The locking segments 12 are then placed in the groove 11 and the point section which has a screw threaded extension 18 is turned onto the screw ring 13 while this is held by the tool above mentioned. In this form axial strains are taken by the locking segments 9, both from the base section and the intermediate section of the roller cutter, and axial strains are also taken by the other locking pieces 12, and these strains may be generated in either the point section or the intermediate section.

In Fig. 5 I show 3 sets of locking segments, one set 12 for the point section, another set 9a in the groove 8a for the intermediate section, and a third set of segments 9 in the groove 8 for the base section. It will be understood that where locking segments lie between two sections of the roller cutter, for instance, the sections 9, they will take axial strains from both the adjacent sections of the roller cutter, but in different directions.

Reverting to the form shown in Fig. 5 the point section may be held in place by a continuous ring 13a which is not screw threaded but has a plain periphery over which the point section may be placed after the said continuous ring has been positioned against the segments 9a and has been locked in place by the segments 12.

For securing the point section to this ring 13a openings may be provided at 14x through which a welding torch may find access to the ring and adjoining parts of the point section for welding them together. In the instance just noted, the openings may be sufficiently large for the welding action or smaller openings may be provided to receive dowel pins 15a, and these may be welded in place, said dowels connecting the point section with the ring 13a. In this form of Fig. 5 the continuous ring 13a may be recessed at 13b so as to fit over the locking ring 9a for retaining it within the groove 8a. It is to be understood that the openings 14 are placed in the grooves between the cutting edges of the teeth.

In Fig. 6 the screw ring 13c which performs a function similar to the ring 13a above mentioned, is provided with an opening at 13d to receive the end of a tool 16a for holding it against rotation while the point section is being screw threaded onto this ring. This tool may be introduced through recess 17a formed in the intermediate section of the roller cutter, said recess being large enough to allow the tool to have some lateral movement so that it may be disengaged from the ring 13c and removed after the point section has been connected thereto. This ring 13c is recessed at its inner face for overlying the locking segments 9a.

In Fig. 7 I show a form in which the point section is made up of two portions 6a and 7b having a screw threaded connection between them at 18a. This composite point section is held in place by locking segments 12x in an annular groove of the spindle, and located in a recess or enlargement of the bore of the portion 6a. The base section is held in place substantially as above described in connection with the other forms. Of course, in this modification the portion 7b may be held in any suitable manner as it is exposed, and while so held the portion 6a may be screw threaded into connection therewith. It will be understood, of course, that after the portion 7b is placed on the spindle, the locking segments 12x are placed in their groove and the portion 6a is then moved over these locking segments and screw threaded into the section 7b. The assembly may be spot welded together (6a and 7b) through holes placed in the grooves between cutting edges of teeth in order to reach threads with the weld.

I claim:

In a sectional roller cutter organization for earth boring drills, the combination of a spindle, a conical point section with means for holding it rotatively in place at the end of the spindle, a cutter section on the spindle in rear of the point section, said spindle being annularly grooved and a sectional ring in the said annular groove held by a part of the point section, said sectional ring holding the cutter section against axial displacement on the spindle, substantially as described.

In testimony whereof, I affix my signature.

CLARENCE E. REED.